(12) United States Patent
Kargl et al.

(10) Patent No.: US 8,905,310 B2
(45) Date of Patent: Dec. 9, 2014

(54) CONTACTLESS DATA RECEPTION USING A CANCELLATION CIRCUIT

(75) Inventors: Walter Kargl, Graz (AT); Edmund Ehrlich, Graz (AT); Matthias Emsenhuber, Graz (AT)

(73) Assignee: Infineon Technologies AG, Neubiberg (DE)

( * ) Notice: Subject to any disclaimer, the term of this patent is extended or adjusted under 35 U.S.C. 154(b) by 152 days.

(21) Appl. No.: 12/415,070

(22) Filed: Mar. 31, 2009

(65) Prior Publication Data

US 2010/0243737 A1 Sep. 30, 2010

(51) Int. Cl.
G06K 7/00 (2006.01)
G06K 7/10 (2006.01)
H04B 5/00 (2006.01)
G06K 19/07 (2006.01)

(52) U.S. Cl.
CPC .......... *H04B 5/0081* (2013.01); *G06K 7/10346* (2013.01); *G06K 19/0723* (2013.01); *G06K 7/10178* (2013.01)
USPC ........................................ 235/439

(58) Field of Classification Search
USPC ......................................... 235/439
See application file for complete search history.

(56) References Cited

U.S. PATENT DOCUMENTS

| | | | |
|---|---|---|---|
| 5,598,128 A * | 1/1997 | Veit et al. ...................... 330/252 |
| 5,847,662 A * | 12/1998 | Yokota et al. ............... 340/10.34 |
| 5,952,935 A * | 9/1999 | Mejia et al. .................. 340/10.3 |
| 2001/0019264 A1* | 9/2001 | Shattil ............................ 324/225 |
| 2002/0175870 A1* | 11/2002 | Gleener ......................... 343/745 |
| 2007/0096875 A1* | 5/2007 | Waterhouse et al. ......... 340/10.1 |
| 2009/0079524 A1* | 3/2009 | Cyr et al. ......................... 334/78 |
| 2009/0233646 A1* | 9/2009 | Cyzs et al. .................. 455/562.1 |

* cited by examiner

*Primary Examiner* — Michael G Lee
*Assistant Examiner* — David Tardif
(74) *Attorney, Agent, or Firm* — Schiff Hardin LLP (57) ABSTRACT

A contactless device including a transmission antenna configured to transmit a transmission signal; a pickup antenna configured to detect a field generated by a pickup signal, which comprises a response signal transmitted from another contactless device and the transmission signal; and a cancellation circuit configured to subtract a voltage of the transmission antenna from a voltage of the pickup antenna.

23 Claims, 7 Drawing Sheets

FIGURE 6B

CONTACTLESS DATA RECEPTION USING A CANCELLATION CIRCUIT

BACKGROUND

The present invention is directed to a contactless communication system having a high bit rate contactless data transfer.

Figure 7:
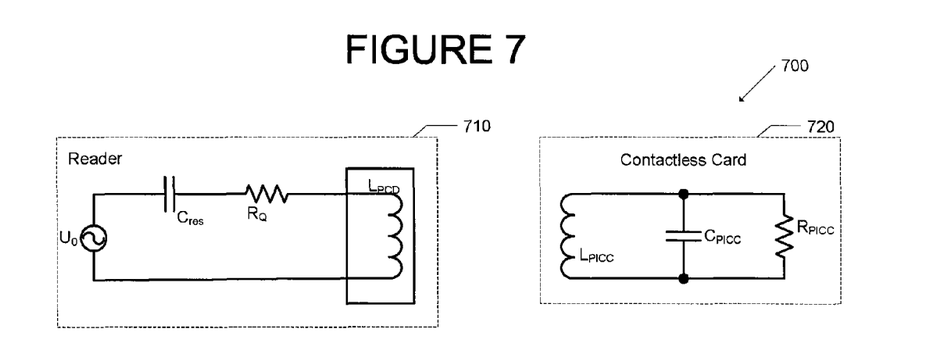
FIG. 7 illustrates a known contactless communication system.

FIG. 7 illustrates a known contactless communication system 700. The basic components of contactless communication system 700 are a reader 710 and a contactless card 720.

The reader 710 is also known as a Proximity Coupling Device (PCD). The reader 710 includes generator voltage $U_0$, transmission antenna $L_{PCD}$, resonance capacitor $C_{res}$, and resistor $R_Q$. Transmission antenna $L_{PCD}$ and resonance capacitor $C_{res}$ are configured to be in resonance, such that at a predetermined frequency, only resistor $R_Q$ is seen from the perspective of the generator voltage $U_0$.

The contactless card 720 is also known as a Proximity Integrated Circuit Chip (PICC), a smart card, a tag, a transponder, or a Radio Frequency Identification (RFID) tag. Contactless card 720 includes an inductive antenna $L_{PICC}$, resonance capacitor $C_{PICC}$, and power consuming resistor $R_{PICC}$. Antenna $L_{PICC}$ and resonance capacitor $C_{PICC}$ form a resonance circuit, and are configured to provide contactless card 720 with a specific resonance frequency.

In operation, transmission antenna $L_{PCD}$ transmits a carrier signal, typically having a frequency of 13.56 MHz, which generates a transmission field to supply the contactless card 720 with power and data. Data can be transmitted to contactless card 720 by amplitude modulation of the carrier signal. When the contactless card 720 penetrates the transmission field of the reader 710, the transmission field induces a current in card antenna $L_{PICC}$. A voltage corresponding to the induced current is then multiplied by the resonance circuit. The contactless card 720 is configured to transmit a response signal, which is provides as the carrier signal with data modulated on a subcarrier frequency, typically at a frequency of 848 KHz. The response signal generates a response field that is detected by the transmission antenna $L_{PCD}$ of reader 710.

In known systems such as contactless system 700, the communication protocol between the reader and the contactless card may be defined by any of numerous ISO (International Organization for Standardization) standards, such as 14443 Type A/B/C, 15693, 18000, etc.

Furthermore, the contactless communication system 700 is described as having downlink and uplink communication. The downlink communication is the transferring of data, and possibly power, from the reader 710 to the contactless card 720, while the uplink communication is the transferring of data from the card 720 to the reader 710.

To optimize energy transfer during downlink communication from the reader 710 to the contactless card 720, the reader's high-Q resonance circuit, comprising resonance capacitor $C_{res}$ and transmission antenna $L_{PCD}$ focuses on the carrier frequency. The resulting bandwidth is low, and subfrequencies carrying data transmitted to contactless card 720 as well as data transmitted back from contactless card 720 are attenuated.

To speed up data communication in the uplink direction, the subcarrier frequencies carrying data are increased. Since the reader's high-Q resonance circuit attenuates subcarrier frequencies, optimizing energy transfer in the known contactless communication systems therefore has had a negative impact on data transfer.

DETAILED DESCRIPTION

The present application is directed to a contactless communication system and method of improving speed of data communicated between a contactless card and a contactless reader by eliminating distortion and attenuation to significantly increase communication quality at high baudrates.

In some embodiments, the reader includes a separate pickup antenna and a cancellation circuit to compensate for a reader transmission antenna field, which is generated by a current in the reader transmission antenna. In operation, the pickup antenna detects the reader transmission antenna field together with the contactless card antenna field. The cancellation circuit is configured to cancel the reader transmission antenna field while maintaining the contactless card antenna field almost undistorted due to that fact that the induced voltage of the contactless card antenna field detected by the separate pickup antenna is not attenuated by the reader's resonance circuit.

The reader transmission antenna field component of the magnetic field detected by pickup antenna $L_{pickup\_PCD}$ is derived from two voltage sources and is attenuated by the reader's resonance circuit, and thus fast modulation sequences cannot be detected easily. The response field or contactless card antenna field, on the other hand, is not attenuated by the reader's resonance circuit.

In other embodiments, the card includes a separate pickup antenna and a cancellation circuit to compensate for a card transmission antenna field, which is generated by a current in the card transmission antenna.

In yet other embodiments, each of the reader and the card includes a separate pickup antenna and a cancellation circuit to compensate for a card transmission antenna field, which is generated by a current in the card transmission antenna It is noted that some of the components of the embodiments shown in the figures described below are also utilized in the known contactless communication system 700 of FIG. 7. Accordingly, these components are illustrated using the same or similar reference symbols. Examples of such components include reader voltage generator $U_0$, resonance capacitor $C_{res}$ and resistor $R_Q$. For the sake of brevity, their descriptions will not be repeated for each embodiment.

Figure 1A:
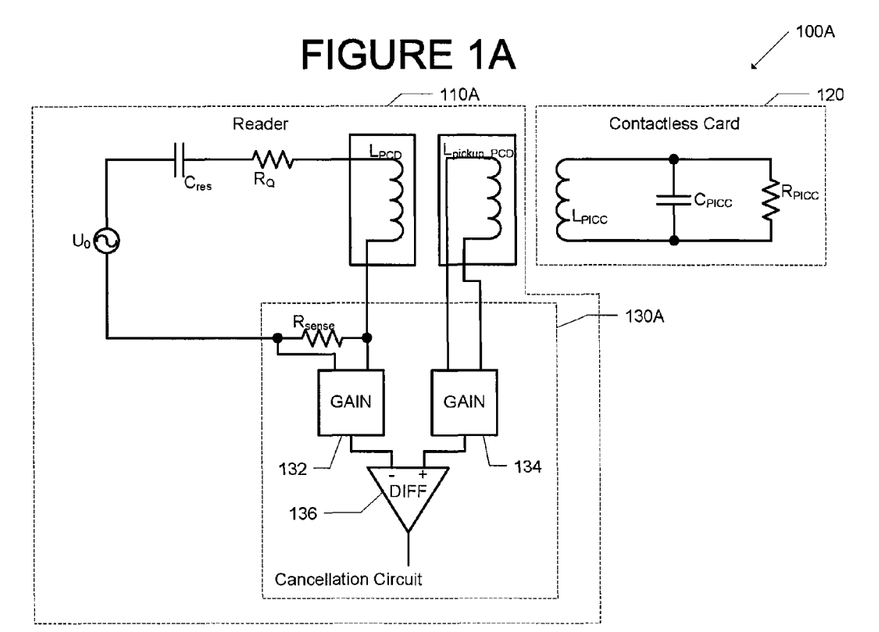
FIG. 1A illustrates a contactless communication system according to an embodiment of the invention.

FIG. 1A illustrates a contactless communication system 100A according to an embodiment of the invention.

As shown, contactless communication system 100A includes contactless reader 110A and contactless card 120. Contactless card 120 is configured the same as contactless card 720 described above with respect to FIG. 7, and thus its description need not be repeated here.

Reader 110A includes transmission antenna $L_{PCD}$, pickup antenna $L_{pickup\_PCD}$, and cancellation circuit 130A.

Pickup antenna $L_{pickup\_PCD}$ is typically located in the plane of transmission antenna $L_{PCD}$ or close to transmission antenna $L_{PCD}$. In this embodiment, pickup antenna $L_{pickup\_PCD}$ should be positioned in reader 110A such that the coupling with transmission antenna $L_{PCD}$ is sufficient, and thus it should be more or less centered with respect to transmission antenna $L_{PCD}$. However, it should be appreciated that pickup antenna $L_{pickup\_PCD}$ and transmission antenna $L_{PCD}$ being centered with respect to one another is not necessarily required.

Cancellation circuit 130A includes current measuring resistor $R_{sense}$, first amplifier 132, second amplifier 134, and differential amplifier 136. Current measuring resistor $R_{sense}$ is coupled between reader voltage generator $U_0$ and one branch of transmission antenna $L_{PCD}$. As such, current measuring resistor $R_{sense}$ is configured to measure the current through transmission antenna $L_{PCD}$. Based on the measured current, the voltage across current measuring resistor $R_{sense}$ can be determined and effectively provide a voltage of transmission antenna $L_{PCD}$. As shown, current measuring resistor $R_{sense}$ can be a separate resistor. However, in an alternative embodiment, resistor $R_{sense}$ can be integrated into the resistor $R_Q$.

First amplifier 132 has two inputs and an output. The inputs are coupled to respective ends of current measuring resistor $R_{sense}$, and, therefore one of these inputs is also coupled to the same branch of transmission antenna $L_{PCD}$ as current measuring resistor $R_{sense}$. The output of first amplifier 132 is coupled to an inverting input of differential amplifier 136. Second amplifier 134 has two inputs coupled to the respective branches of pickup antenna $L_{pickup\_PCD}$, and an output that is coupled to a non-inverting input of differential amplifier 136.

In operation, voltage generator $U_0$ generates a voltage controlling transmission antenna $L_{PCD}$ to transmit a carrier signal to reader 110A. The carrier signal generates a transmission field to supply the contactless card 120 with power and data. Data transmission can be achieved through amplitude modulation of the carrier signal.

When contactless card 120 penetrates the transmission field of the reader 110A, the transmission field induces a current in card antenna $L_{PICC}$. A voltage corresponding to the induced current is then multiplied by the series resonant circuit, i.e., the card antenna $L_{PICC}$ and the resonance capacitor $C_{PICC}$. Contactless card 120 then transmits a response signal, which is the carrier signal with data modulated on a subcarrier frequency. In particular, response signal is a magnetic response field, which is generated by current flowing through the contactless card antenna $L_{PICC}$. The transmission antenna $L_{PCD}$ detects the field generated by the contactless card antenna $L_{PICC}$.

Furthermore, pickup antenna $L_{pickup\_PCD}$ is configured to detect the magnetic field, which is proportional to a sum of the field of the transmission antenna $L_{PCD}$ and the field of the card antenna $L_{PICC}$. In contrast to transmission antenna $L_{PCD}$, this pickup antenna $L_{pickup\_PCD}$ is not driving any current and therefore not generating a transmission field, rather, it is provided to detect the reader transmission field and the contactless card response field by way of induction. Since pickup antenna $L_{pickup\_PCD}$ is separate from the reader's resonance circuit, the voltage/current induced therein is not attenuated.

Furthermore, current measuring resistor $R_{sense}$ detects the current of transmission antenna $L_{PCD}$, which is responsible for generating the reader transmission field. The voltage across the current measuring resistor $R_{sense}$ represents a transmission antenna voltage $V_{PCD}$. This voltage is input to first amplifier 132.

First amplifier 132 then amplifies the transmission antenna voltage $V_{PCD}$, and inputs the amplified voltage to the inverting input of differential amplifier 136.

In addition, second amplifier 134 amplifies a voltage across the pickup antenna $L_{pickup\_PCD}$, which is the pickup voltage $V_{pickup\_PCD}$. The amplified pickup voltage $V_{pickup\_PCD}$ is input to the non-inverting input of differential amplifier 136.

It is appreciated by those of ordinary skill in the art that since the current of transmission antenna $L_{PCD}$ is sensed by current measuring resistor $R_{sense}$, the corresponding transmission antenna voltage $V_{PCD}$ is phase-shifted 90° as compared to the pickup voltage $V_{pickup\_PCD}$. Therefore transmission antenna voltage $V_{PCD}$ should be shifted 90° before being input to differential amplifier 136 to be consistent with the phase of pickup voltage $V_{pickup\_PCD}$. A phase-shifter is not shown in FIG. 1A so as to not unnecessarily obscure other aspects of the embodiment. This phase-shift is not an issue with respect to the current sensing capacitor $C_{sense}$ of FIG. 1B or the current sensing inductor $L_{sense}$ of FIG. 1C to be described below. However, in any of these embodiments, voltages can be slightly phase-shifted to compensate for any parasitic circuit behavior.

Differential amplifier 136 is configured to subtract the amplified transmission antenna voltage $V_{PCD}$ from the amplified pickup voltage $V_{pickup\_PCD}$ to remove the transmission antenna voltage $V_{PCD}$ component from the pickup voltage $V_{pickup\_PCD}$. Differential amplifier 136 outputs a voltage $V_{PICC}$ representing a response signal transmitted by contactless card antenna $L_{PICC}$. Since this voltage $V_{PICC}$ is not attenuated by the reader's resonance circuit, high quality data transmission from contactless card 120 can be achieved at high baudrates.

Figure 1B:
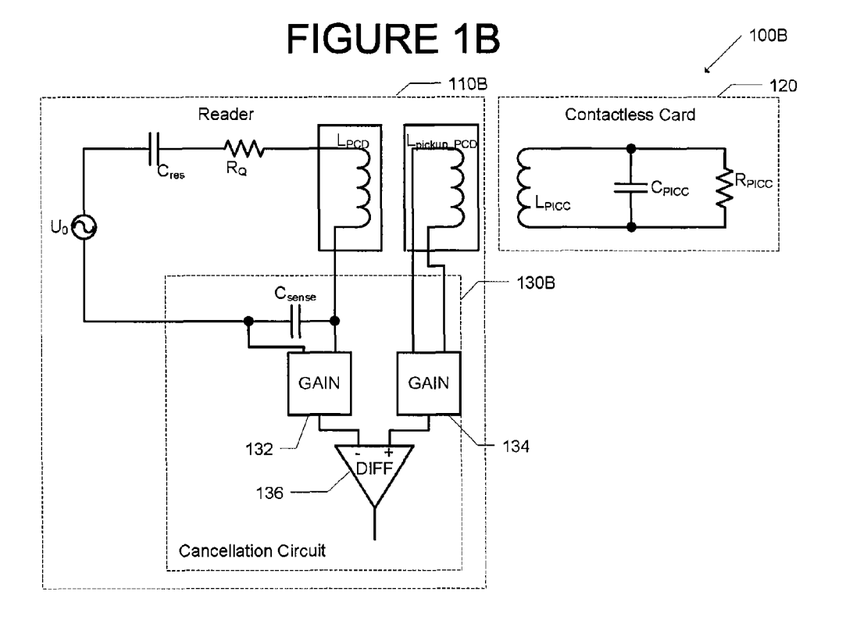
FIG. 1B illustrates a contactless communication system according to another embodiment of the invention.

FIG. 1B illustrates a contactless communication system 100B according to another embodiment of the invention.

Contactless communication system 100B of this embodiment is similar to contactless communication system 100A of the embodiment shown in FIG. 1A, except that current sensing resistor $R_{sense}$ is replaced with current sensing capacitor $C_{sense}$. In the contactless communication system 100A of FIG. 1A, there is a resistive behavior, so voltage and current have the same phase. In this embodiment of FIG. 1B using a current sensing capacitor $C_{sense}$, the voltage has a phase shift of −90° with respect to the current, as is appreciated by those of ordinary skill in the art.

The other components of FIG. 1B are similar to the ones described above with respect to FIG. 1A, and for the sake of brevity their descriptions will not be repeated here.

Figure 1C:
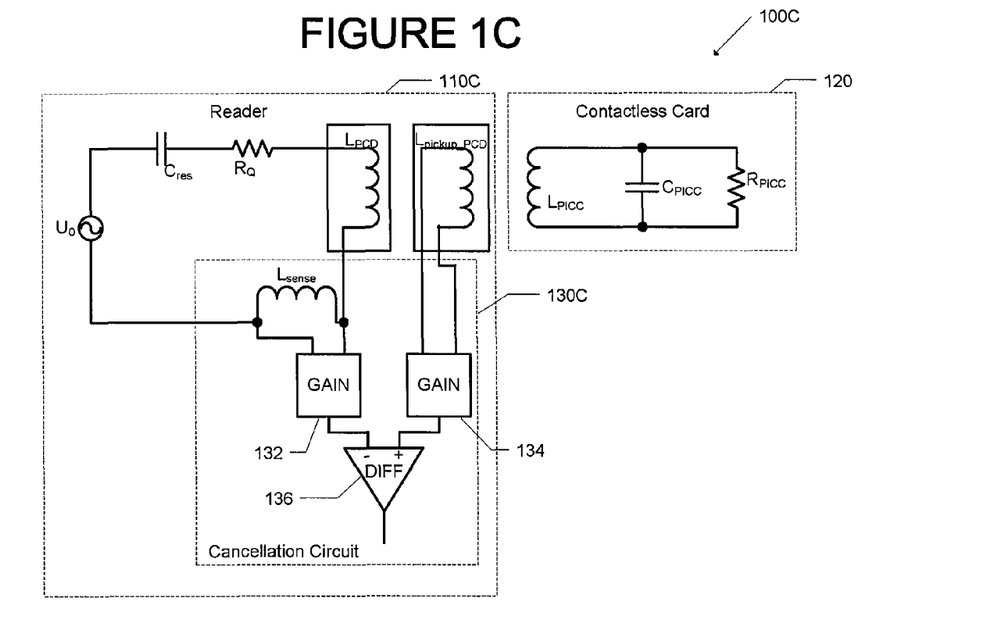
FIG. 1C illustrates a contactless communication system according to another embodiment of the invention.

FIG. 1C illustrates a contactless communication system 100C according to another embodiment of the invention.

Contactless communication system 100C of this embodiment is similar to contactless communication system 100A of the embodiment shown in FIG. 1A, except that current sensing resistor $R_{sense}$ is replaced with current sensing inductor $L_{sense}$. In the contactless communication system 100A of FIG. 1A, there is a resistive behavior, so voltage and current have the same phase. In this embodiment of FIG. 1C using a current sensing inductor $L_{sense}$, the voltage has a phase shift of +90° with respect to the current, as is appreciated by those of ordinary skill in the art.

The other components of FIG. 1C are similar to the ones described above with respect to FIG. 1A, and for the sake of brevity their descriptions will not be repeated here.

Figure 2A:
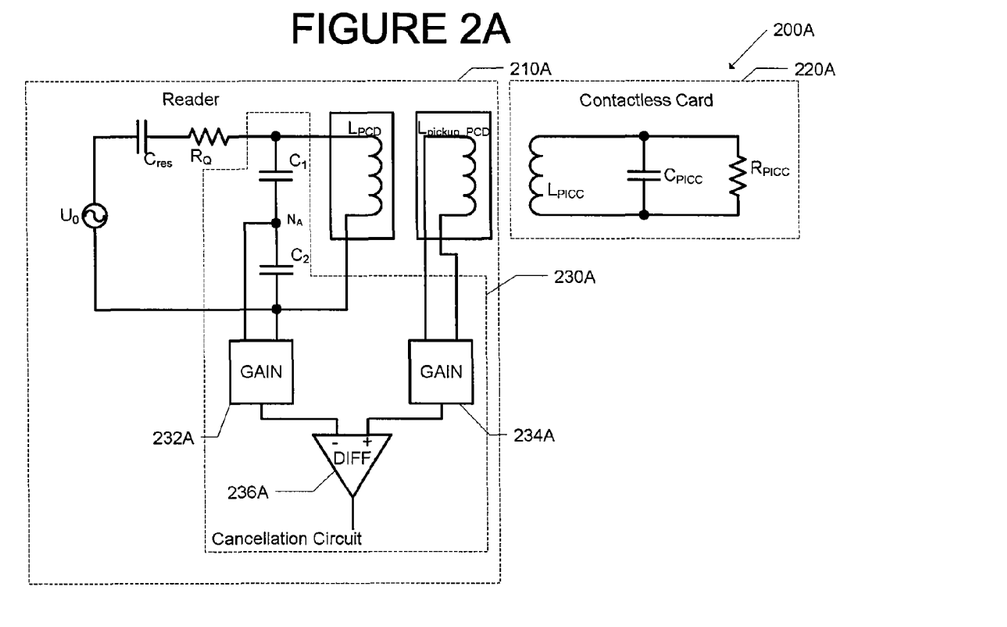
FIG. 2A illustrates a contactless communication system according to another embodiment of the invention.

FIG. 2A illustrates a contactless communication system 200A according to another embodiment of the invention. Contactless communication system 200A is similar to the contactless communication systems 100A, 100B, and 100C described above with respect to FIGS. 1A-1C, respectively, except that rather than detecting the current which is driven through transmission antenna $L_{PCD}$, and converting this current to a voltage, a voltage across the driving inductance of transmission antenna $L_{PCD}$ is detected directly.

The voltage across transmission antenna $L_{PCD}$ is high, and therefore a capacitive divider is used. The capacitive divider comprises a first capacitor $C_1$ coupled between a first branch of transmission antenna $L_{PCD}$ and a node $N_A$, and a second capacitor $C_2$ coupled between a second branch of transmission antenna $L_{PCD}$ and node $N_A$. Node $N_A$ and the second branch of transmission antenna $L_{PCD}$ are also coupled to amplifier 232.

Basically, this embodiment of FIG. 2A illustrates another manner of measuring the reader transmission field indirectly using the voltage $V_{PCD}$ of the transmission antenna $L_{PCD}$ rather than the current. Otherwise, contactless communication system 200A is similar to the contactless communication systems of the embodiments of FIGS. 1A-1C.

Figure 2B:
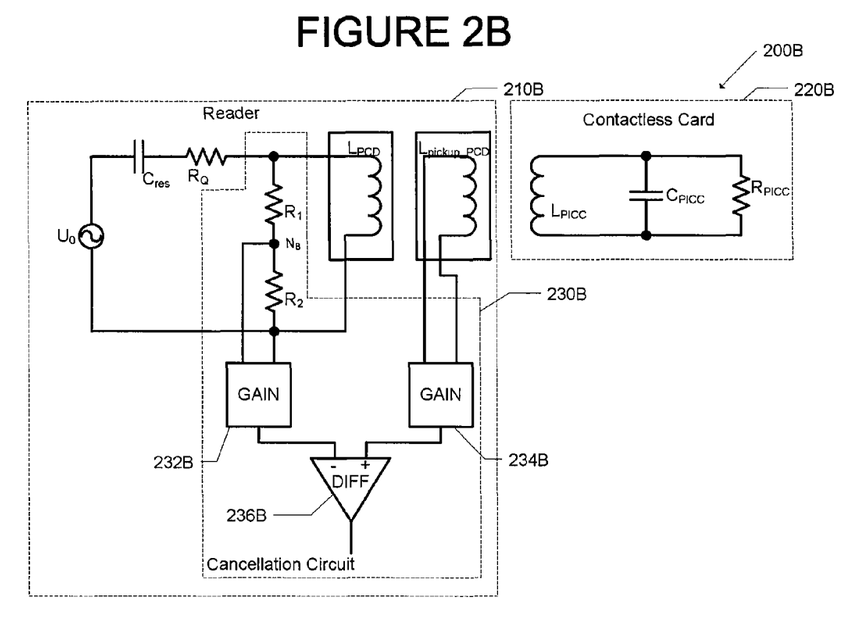
FIG. 2B illustrates a contactless communication system according to another embodiment of the invention.

FIG. 2B illustrates a contactless communication system 200B according to another embodiment of the invention. The contactless communication system 200B of this embodiment is similar to the contactless communication system 200A of the embodiment shown in FIG. 2A, except that the capacitive divider is replaced by a resistive divider. The resistive divider comprises a first resistor $R_1$ coupled between a first branch of transmission antenna $L_{PCD}$ and a node $N_B$, and a second resistor $R_2$ coupled between a second branch of transmission antenna $L_{PCD}$ and node $N_B$. Node $N_B$ and the second branch of transmission antenna $L_{PCD}$ are also coupled to amplifier 232.

Figure 3:
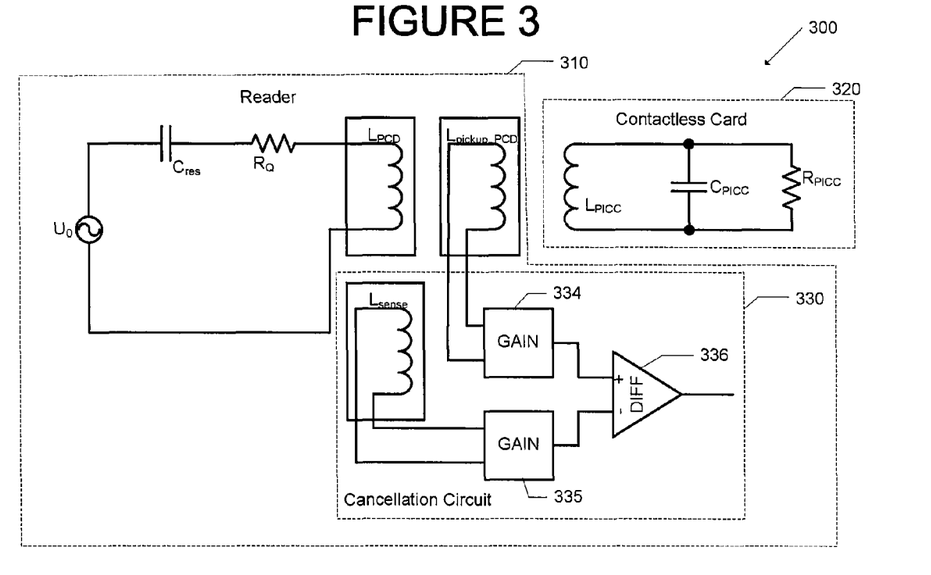
FIG. 3 illustrates a contactless communication system according to another embodiment of the invention.

FIG. 3 illustrates a contactless communication system 300 according to another embodiment of the invention. The contactless communication system 300 of this embodiment is similar to the contactless communication system 100A of the embodiment shown in FIG. 1A, except that current sensing resistor $R_{sense}$ is basically replaced with a second pickup antenna, or sensing antenna $L_{sense}$.

Sensing antenna $L_{sense}$ senses the field of the reader transmission antenna $L_{PCD}$ only. It does not sense the field of the contactless card antenna $L_{PICC}$ due to its shape and geometrical placement with respect to transmission antenna $L_{PCD}$.

Sensing antenna $L_{sense}$ is located at the transmission antenna $L_{PCD}$, but it is not centered with respect to the transmission antenna $L_{PCD}$ as generally with the pickup antenna $L_{pickup\_PCD}$. Sensing antenna $L_{sense}$ is located such that a carrier field inducing a voltage in the sensing antenna $L_{sense}$ is suppressed by the carrier field of the contactless card antenna $L_{PICC}$, while maintaining the ability to fully couple with the transmission antenna $L_{PCD}$. Field suppression occurs during induction of two voltages with the same amplitude, but opposite direction (180° phase shift). Thus, while pickup antenna $L_{pickup\_PCD}$ couples with transmission antenna $L_{PCD}$ and card antenna $L_{PICC}$, this sensing antenna $L_{sense}$ couples only with the transmission antenna $L_{PCD}$.

Each of the branches of sensing antenna $L_{sense}$ is coupled to the inputs of second amplifier 335. The voltage of sensing antenna $L_{sense}$, $V_{sense}$, is input to second amplifier 335, which outputs an amplified sensing antenna voltage $V_{sense}$ to the inverting input of differential amplifier 336. Similarly, the pickup antenna voltage $V_{pickup\_PCD}$ is input to first amplifier 334, which outputs the amplified pickup antenna voltage $V_{pickup\_PCD}$ to the non-inverting input of differential amplifier 336. Differential amplifier 336 then subtracts the amplified sensing antenna voltage $V_{sense}$ from the amplified pickup antenna voltage $V_{pickup\_PCD}$, to remove the transmission antenna voltage $V_{PCD}$ component of the pickup voltage $V_{pickup\_PCD}$, and outputs a voltage corresponding to the current through the contactless card antenna $L_{PICC}$.

The other components of FIG. 3 are similar to the ones described above with respect to the other embodiments, and for the sake of brevity their descriptions will not be repeated here.

Figure 4:
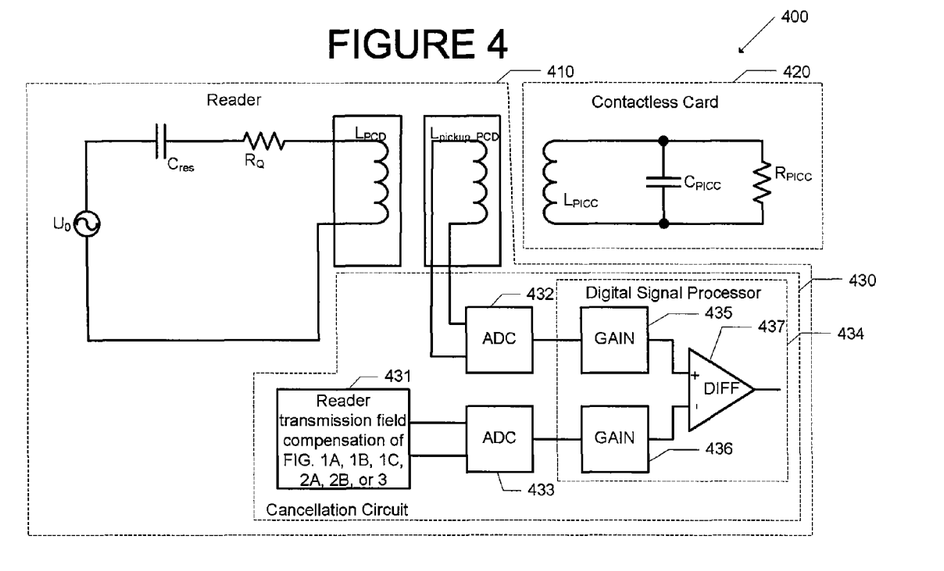
FIG. 4 illustrates a contactless communication system according to another embodiment of the invention.

FIG. 4 illustrates a contactless communication system 400 according to another embodiment of the invention. Contactless communication system 400 differs from the contactless communication systems of the embodiments described above by using digital cancellation rather than analog cancellation. This digital cancellation may be a continuous digital cancellation, or initial calibration digital cancellation, as will be described below.

Cancellation circuit 430 of contactless communication system 400 includes a reader transmission field compensation unit 431, two analog-to-digital converters 432, 433, two amplifiers 435, 436 and a differential amplifier 437. The two amplifiers 435, 436 and differential amplifier 437 make up a digital signal processor 434.

Reader transmission field compensation unit 431 is one of the sensing elements as described above with respect to any of FIGS. 1A, 1B, 1C, 2A, 2B, and 3. More specifically, the reader transmission field compensation unit 431 may be current measuring resistor $R_{sense}$ of FIG. 1A, current sensing capacitor $C_{sense}$ of FIG. 1B, current sensing inductor $L_{sense}$ of FIG. 1C, capacitive divider (capacitors $C_1$ and $C_2$) of FIG. 2A, resistive divider (resistors $R_1$ and $R_2$) of FIG. 2B, or sensing antenna $L_{sense}$ of FIG. 3.

Reader transmission field compensation unit 431 outputs are coupled to the respective inputs of analog-to-digital converter 433. Amplifier 436 is coupled between the output of analog-to-digital converter 433 and the inverting input of differential amplifier 437.

The branches of pickup antenna $L_{pickup\_PCD}$ are coupled to the respective inputs of analog-to-digital converter 432. Amplifier 435 is coupled between the output of analog-to-digital converter 432 and the non-inverting input of differential amplifier 437.

During operation, the voltage of reader transmission field compensation unit 431 is sampled, that is converted from analog to digital format by analog-to-digital converter 433 to output a digital transmission antenna voltage $V_{PCD}$. Similarly, the voltage of pickup antenna $L_{pickup\_PCD}$ is converted from analog to digital format by analog-to-digital converter 432 to output a digital pickup antenna voltage $V_{pickup\_PCD}$.

The digital transmission antenna voltage $V_{PCD}$ and the digital pickup antenna voltage $V_{pickup\_PCD}$ are then digitally processed by digital signal processor 434. More specifically, the digital transmission antenna voltage $V_{PCD}$ is amplified by amplifier 436, and the digital pickup antenna voltage $V_{pickup\_PCD}$ is amplified by amplifier 435. The amplified transmission antenna voltage $V_{PCD}$ is then input to inverting input of differential amplifier 437, and the amplified pickup antenna voltage $V_{pickup\_PCD}$ is input to the non-inverting input of differential amplifier 437. The differential amplifier 437 then subtracts the amplified transmission antenna voltage $V_{PCD}$ from the amplified pickup antenna voltage $V_{pickup\_PCD}$ to output a voltage $V_{PICC}$ of contactless card antenna $L_{PICC}$.

As mentioned above, the digital cancellation of this embodiment may be a continuous digital cancellation, or initial calibration digital cancellation. Using continuous digital cancellation, the transmission antenna voltage $V_{PCD}$ is continuously sampled, that is A/D converted by analog-to-digital converter 433. Also, the pickup antenna voltage $V_{pickup\_PCD}$ is continuously sampled by analog-to-digital converter 432. These digital signals are then digitally processed by digital signal processor 434 as described above.

Alternatively, initial calibration digital cancellation may be used. Initial calibration digital cancellation differs from continuous digital cancellation in that rather than sampling the transmission antenna voltage $V_{PCD}$ continuously, this voltage is sampled once and the value is stored in a memory (not shown). This memory may be any known memory suitable for the intended purpose. The probability that the transmission antenna voltage $V_{PCD}$ changes significantly during the time of data reception is generally small enough that it is not necessary to sample the transmission antenna voltage $V_{PCD}$ continuously. The stored, static transmission antenna voltage $V_{PCD}$ is then used by the digital signal processor 434 to be subtracted from the pickup antenna voltage $V_{pickup\_PCD}$ using differential amplifier 437. The pickup antenna voltage $V_{pickup\_PCD}$ is still continuously sampled by analog-to-digital converter 432 as described above with respect to the continuous digital cancellation.

The other components of FIG. 4 are similar to the ones described above with respect to the other embodiments, and for the sake of brevity their descriptions will not be repeated here.

Figure 5A:
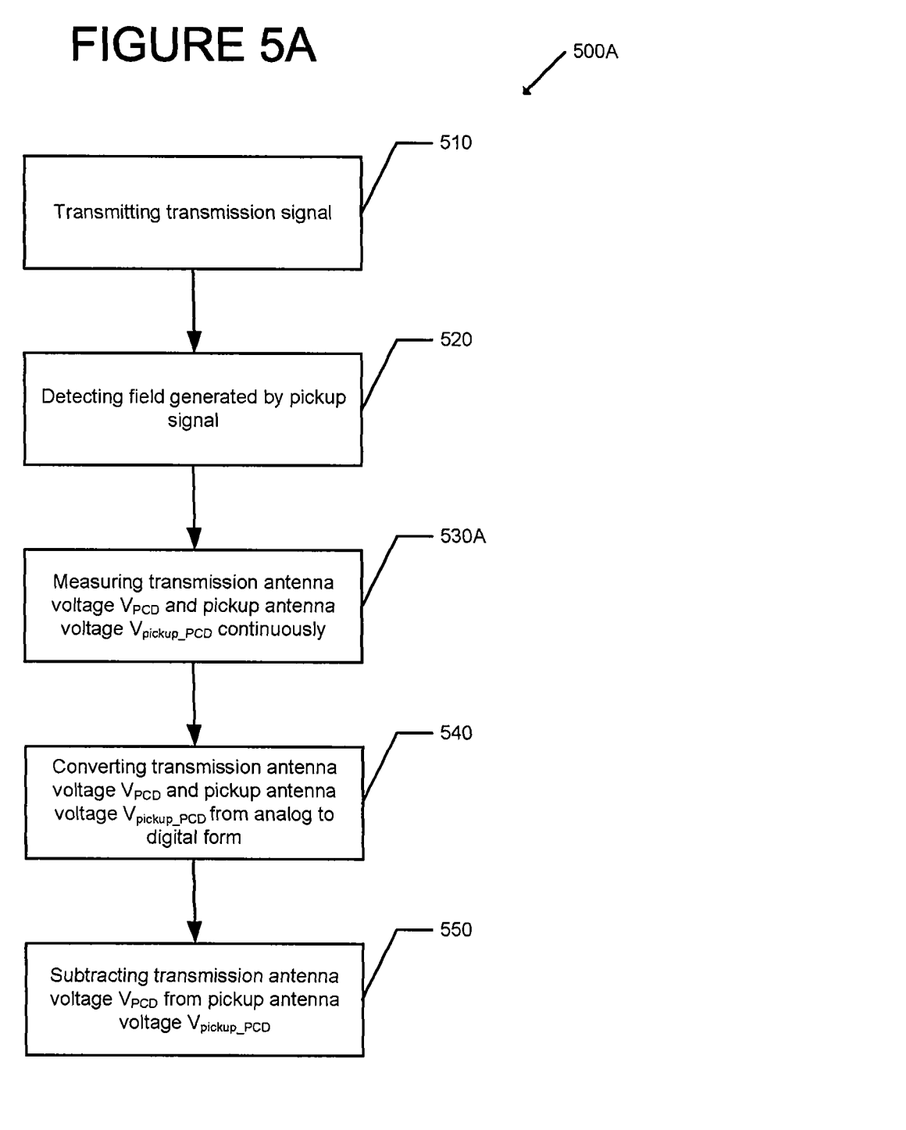
FIG. 5A illustrates a contactless communication method according to an embodiment of the invention.

FIG. 5A illustrates is a contactless communication method 500A according to an embodiment of the invention.

Contactless communication method 500A a continuous digital cancellation method as discussed above with respect to the contactless communication 400 of FIG. 4.

During the contactless communication method 500A, a transmission signal is transmitted by transmission antenna $L_{PCD}$, at Step 510. Subsequently, a field generated by a pickup signal, which comprises a response signal transmitted from contactless card 420 and the transmission signal, is detected by pickup antenna $L_{pickup\_PCD}$, at Step 520. The transmission antenna voltage $V_{PCD}$ and pickup antenna voltage $V_{pickup\_PCD}$ are each measured continuously, at Step 530A. The transmission antenna voltage $V_{PCD}$ and the pickup antenna voltage $V_{pickup\_PCD}$ are converted from analog to digital form by analog-to-digital converters 433, 432, at Step 540. Finally, the transmission antenna $V_{PCD}$ is subtracted from the pickup antenna voltage $V_{pickup\_PCD}$ by differential amplifier 437, at Step 550. The voltage resulting from the subtraction is a voltage corresponding to the current through the contactless card antenna $L_{PICC}$.

Figure 5B:
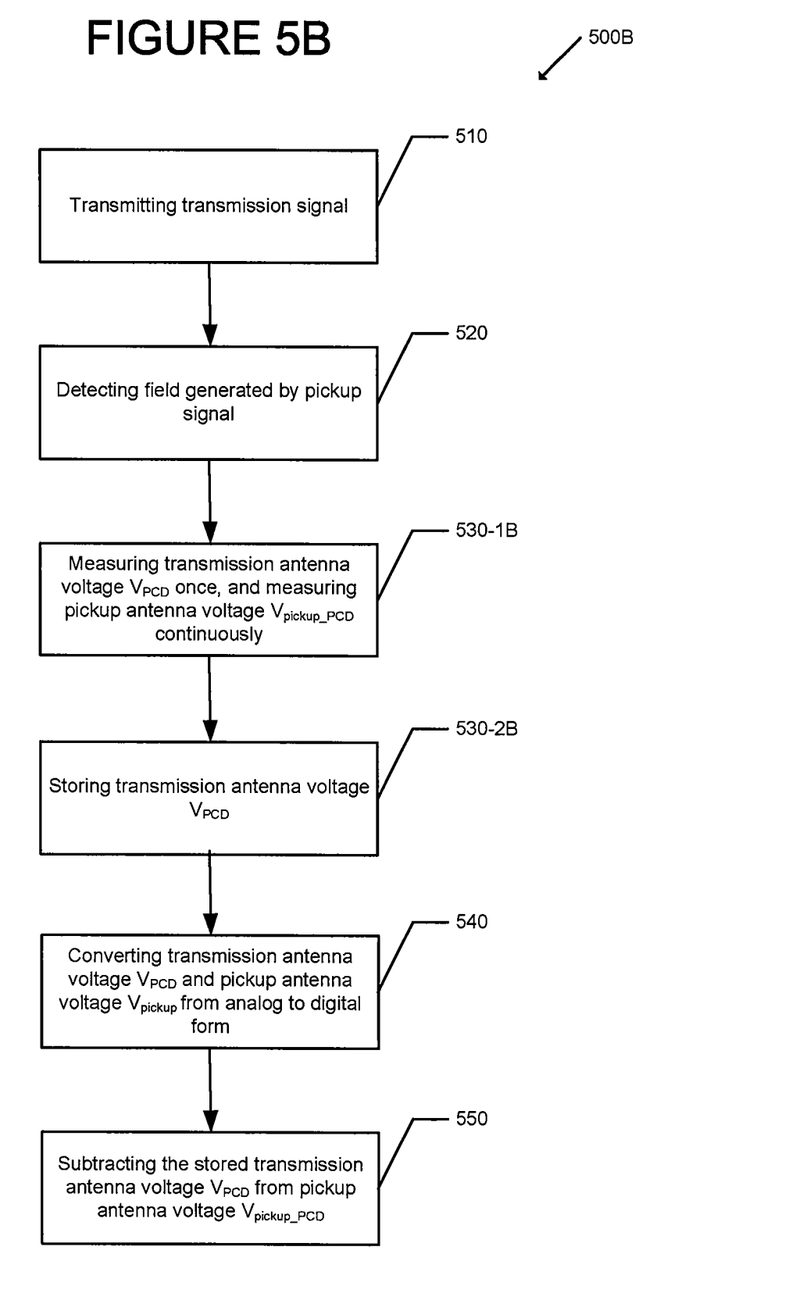
FIG. 5B illustrates a contactless communication method according to another embodiment of the invention.

FIG. 5B illustrates a contactless communication method according to another embodiment of the invention.

Contactless communication method 500B is similar to the contactless communication method 500A of FIG. 5A discussed above, except that contactless communication method 500B involves initial calibration digital cancellation as opposed to the continuous digital cancellation of FIG. 5A.

During the contactless communication method 500B, a transmission signal is transmitted by transmission antenna $L_{PCD}$, at Step 510. Subsequently, a field generated by a pickup signal, which comprises a response signal transmitted from contactless card 420 and the transmission signal, is detected by pickup antenna $L_{pickup\_PCD}$, at Step 520. The transmission antenna voltage $V_{PCD}$ is measured once, and the pickup antenna voltage $V_{pickup\_PCD}$ is measured continuously, at Step 530B. The transmission antenna voltage $V_{PCD}$ and the pickup antenna voltage $V_{pickup\_PCD}$ are converted from analog to digital form by analog-to-digital converters 433, 432, at Step 540. The transmission antenna voltage $V_{PCD}$ is stored in a memory (not shown), at Step 545. The probability that the transmission antenna voltage $V_{PCD}$ changes significantly during the time of data reception is generally small enough that it is not necessary to sample the transmission antenna voltage $V_{PCD}$ continuously. Finally, the stored transmission antenna $V_{PCD}$ is subtracted from the pickup antenna voltage $V_{pickup\_PCD}$ by differential amplifier 437, at Step 550. The voltage resulting from the subtraction is a voltage corresponding to the current through the contactless card antenna $L_{PICC}$.

Figure 6A:
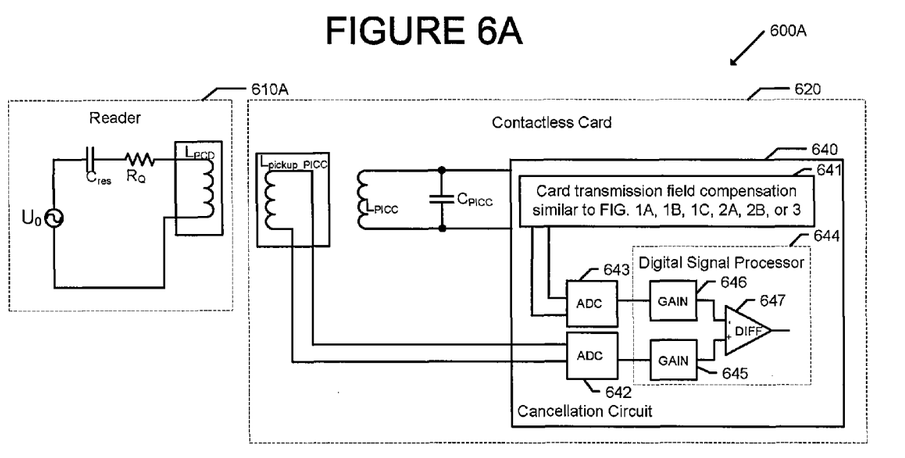
FIG. 6A illustrates a contactless communication system according to another embodiment of the invention.

FIG. 6A illustrates a contactless communication system 600A according to another embodiment of the invention. Contactless communication system 600A differs from the contactless communication systems of the embodiments described above in that instead of the pickup antenna $L_{pickup}$ and the cancellation circuit being located contactless reader 610A, they are located in contactless card 620. As is appreciated, however, there is no active source in contactless card 620 as there is in contactless reader 610A.

Contactless reader 610A is configured the same as contactless reader 710 described above with respect to FIG. 7, and thus its description need not be repeated here.

Contactless card 620 includes transmission antenna $L_{PICC}$, pickup antenna $L_{pickup\_PICC}$ and cancellation circuit 640. Transmission antenna $L_{PICC}$ is the same as the transmission antenna of the contactless cards discussed above with respect to the other embodiments.

Cancellation circuit 640 includes card transmission field compensation unit 641, two analog-to-digital converters 642, 643, two amplifiers 645, 646 and a differential amplifier 647. The two amplifiers 645, 646 and differential amplifier 647 make up a digital signal processor 644.

Card transmission field compensation unit 641 is one of the sensing elements as described above with respect to any of FIGS. 1A, 1B, 1C, 2A, 2B, and 3. More specifically, the card transmission field compensation unit 641 may be current measuring resistor $R_{sense}$ of FIG. 1A, current sensing capacitor $C_{sense}$ of FIG. 1B, current sensing inductor $L_{sense}$ of FIG. 1C, capacitive divider (capacitors $C_1$ and $C_2$) of FIG. 2A, resistive divider (resistors $R_1$ and $R_2$) of FIG. 2B, or sensing antenna $L_{sense}$ of FIG. 3. These sensing elements function in similar manners as described above with respect to the other embodiments. For the sake of brevity, their descriptions will not be repeated here.

Card transmission field compensation unit 641 outputs are coupled to the respective inputs of analog-to-digital converter 643. Amplifier 646 is coupled between the output of analog-to-digital converter 643 and the inverting input of differential amplifier 437.

The branches of pickup antenna $L_{pickup\_PICC}$ are coupled to the respective inputs of analog-to-digital converter 642. Amplifier 645 is coupled between the output of analog-to-digital converter 642 and the non-inverting input of differential amplifier 647.

The operation of cancellation circuit 640 is similar to the operations of cancellation circuits described above with respect to the other embodiments. The voltage of card transmission field compensation unit 641 is sampled, that is converted from analog to digital format by analog-to-digital converter 643 to output a digital transmission antenna voltage $V_{PICC}$. Similarly, the voltage of pickup antenna $L_{pickup\_PICC}$ is converted from analog to digital format by analog-to-digital converter 642 to output a digital pickup antenna voltage $V_{pickup\_PICC}$.

The digital transmission antenna voltage $V_{PICC}$ and the digital pickup antenna voltage $V_{pickup\_PICC}$ are then digitally processed by digital signal processor 644. More specifically, the digital transmission antenna voltage $V_{PICC}$ is amplified by amplifier 646, and the digital pickup antenna voltage $V_{pickup\_PICC}$ is amplified by amplifier 645. The amplified transmission antenna voltage $V_{PICC}$ is then input to inverting input of differential amplifier 647, and the amplified pickup antenna voltage $V_{pickup\_PICC}$ is input to the non-inverting input of differential amplifier 647. The differential amplifier 647 then subtracts the amplified transmission antenna voltage $V_{PICC}$ from the amplified pickup antenna voltage $V_{pickup\_PICC}$ to output a voltage $V_{PCD}$ of contactless card antenna $L_{PCD}$.

This embodiment is described as using digital cancellation, which may be a continuous digital cancellation or initial calibration digital cancellation, as discussed above. Alternatively, the cancellation may be analog cancellation, in which case analog-to-digital converters 642, 643 would not be necessary.

The other components of FIG. 6A are similar to the ones described above with respect to the other embodiments, and for the sake of brevity their descriptions will not be repeated here.

Figure 6B:
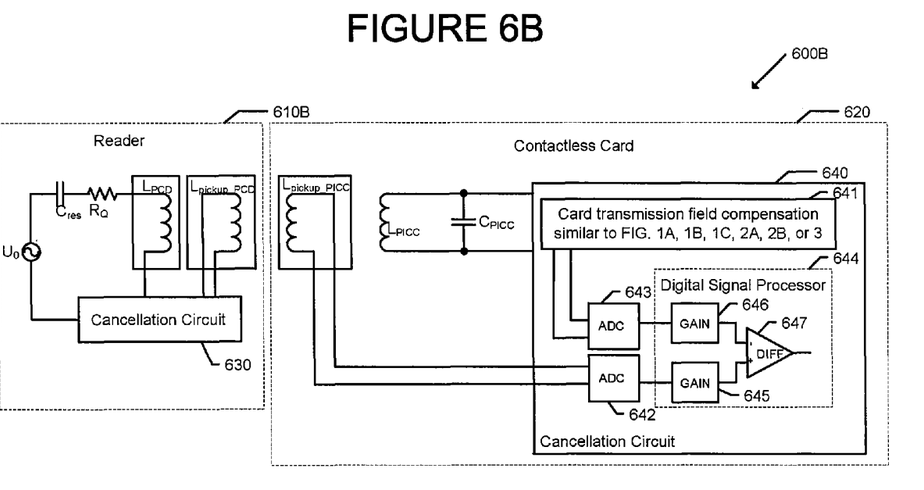
FIG. 6B illustrates a contactless communication system according to another embodiment of the invention.

FIG. 6B illustrates a contactless communication system 600B according to another embodiment of the invention. Contactless communication system 600B is similar to contactless communication system 600A, except that contactless communication system 600B includes a pickup antenna and cancellation circuit in both contactless card 620 and contactless reader 610B. More specifically, contactless card 620 is the same as that of contactless communication system 600A of FIG. 6A, and contactless reader 610B is the same as that of any of the contactless communication systems described above with respect to FIGS. 1A, 1B, 2A, 2B, 3, 4, 5A, and 5B. Since the contactless reader 610B and contactless card 620 have already been described in detail above, their descriptions need not be repeated here.

Although specific embodiments have been illustrated and described herein, it will be appreciated by those of ordinary skill in the art that a variety of alternate and/or equivalent implementations may be substituted for the specific embodiments shown and described without departing from the scope of the present application. This application is intended to cover any adaptations or variations of the specific embodiments discussed herein.

What is claimed is:

1. A contactless card, comprising:
    a high-Q transmission antenna configured to transmit a transmission signal;
    a broadband pickup antenna configured to detect a field generated by a pickup signal, which comprises a response signal transmitted from a contactless reader and the transmission signal; and
    a cancellation circuit configured to subtract in a digital manner a voltage of the high-Q transmission antenna from a voltage of the broadband pickup antenna without subtracting a voltage of the response signal, wherein the cancellation circuit comprises:
        a first analog-to-digital converter configured to convert the voltage of the high-Q transmission antenna from analog to digital form; and
        a second analog-to-digital converter configured to convert the voltage of the broadband pickup antenna from analog to digital form.

2. The contactless card of claim 1, wherein the cancellation circuit comprises:
    a current measuring device configured to measure a current corresponding to the voltage of the high-Q transmission antenna; and
    a subtraction device configured to perform the subtraction.

3. The contactless card of claim 2, wherein the cancellation circuit further comprises:
    a first amplifier coupled between the current measuring device and the subtraction device, and configured to amplify the voltage of the high-Q transmission antenna; and
    a second amplifier coupled between the broadband pickup antenna and the subtraction device, and configured to amplify the voltage of the broadband pickup antenna.

4. The contactless card of claim 2, wherein the current measuring device is a resistor.

5. The contactless card of claim 2, wherein the current measuring device is a capacitor.

6. The contactless card of claim 2, wherein the current measuring device is an inductor.

7. The contactless card of claim 2, wherein the subtraction device is a differential amplifier.

8. The contactless card of claim 1, wherein the broadband pickup antenna is located in the plane of the high-Q transmission antenna.

9. The contactless card of claim 1, wherein the broadband pickup antenna is centered with respect to the high-Q transmission antenna.

10. The contactless card of claim 1, wherein the cancellation circuit comprises:
    a voltage measuring device configured to measure the voltage across the high-Q transmission antenna; and
    a subtraction device configured to perform the subtraction.

11. The contactless card of claim 10, wherein the voltage measuring device is a capacitive divider.

12. The contactless card of claim 10, wherein the voltage measuring device is a resistive divider.

13. The contactless card of claim 1, further comprising a second pickup antenna configured to detect the transmission signal only.

14. The contactless card of claim 1, wherein the cancellation circuit is configured to perform the subtraction in an analog manner.

15. The contactless card of claim 1, wherein the cancellation circuit performs the subtraction continuously.

16. The contactless card of claim 1, wherein the cancellation circuit performs the subtraction using a static voltage of the high-Q transmission antenna.

17. A contactless communication system comprising:
    a contactless reader; and
    a contactless card, comprising:
        a high-Q transmission antenna configured to transmit a transmission signal;
        a broadband pickup antenna configured to detect a field generated by a pickup signal, which comprises a response signal transmitted from the contactless reader, and the transmission signal; and
        a cancellation circuit configured to subtract in a digital manner a voltage of the high-Q transmission antenna from a voltage of the broadband pickup antenna without subtracting a voltage of the response signal, wherein the cancellation circuit comprises:
            a first analog-to-digital converter configured to convert the voltage of the high-Q transmission antenna from analog to digital form; and a second analog-to-digital converter configured to convert the voltage of the broadband pickup antenna from analog to digital form.

18. The contactless communication system of claim 17, wherein the contactless reader comprises:
   a further transmission antenna configured to transmit a further transmission signal;
   a further pickup antenna configured to detect a field generated by a further pickup signal, which comprises a response signal transmitted from the contactless card, and the further transmission signal; and
   a further cancellation circuit configured to subtract a voltage of the further transmission antenna from a voltage of the further pickup antenna.

19. A method for detecting a response signal at a contactless card, comprising:
   transmitting a transmission signal by a high-Q transmission antenna;
   detecting a field generated by a pickup signal, which comprises the response signal transmitted from a contactless reader and the transmission signal, by a broadband pickup antenna; and
   subtracting in a digital manner a voltage of the high-Q transmission antenna from a voltage of the broadband pickup antenna without subtracting a voltage of the response signal, wherein the subtracting comprises:
      converting the voltage of the high-Q transmission antenna from analog to digital form; and
      converting the voltage of the broadband pickup antenna from analog to digital form.

20. The method of claim 19, further comprising measuring the voltage of the high-Q transmission antenna continuously.

21. The method of claim 19, further comprising:
measuring the voltage of the high-Q transmission antenna; and
storing the voltage of the high-Q transmission antenna,
   wherein the subtracting step comprises subtracting the stored voltage of the high-Q transmission antenna from the voltage of the broadband pickup antenna.

22. The method of claim 19, further comprising:
converting the voltage of the high-Q transmission antenna from analog to digital form; and
converting the voltage of the broadband pickup antenna from analog to digital form;
wherein the subtraction is performed in a digital manner.

23. A contactless card, comprising:
   a high-Q transmission antenna configured to transmit a transmission signal;
   a broadband pickup antenna configured to detect a field generated by a pickup signal, which comprises a response signal transmitted from a contactless reader and the transmission signal; and
   a cancellation means for subtracting in a digital manner a voltage of the high-Q transmission antenna from a voltage of the broadband pickup antenna without subtracting a voltage of the response signal, wherein the cancellation circuit comprises:
      a first analog-to-digital converter configured to convert the voltage of the high-Q transmission antenna from analog to digital form; and
      a second analog-to-digital converter configured to convert the voltage of the broadband pickup antenna from analog to digital form.

* * * * *